(12) United States Patent
Chowdhury et al.

(10) Patent No.: US 8,539,602 B2
(45) Date of Patent: Sep. 17, 2013

(54) MICROCONTROLLER WITH SECURE FEATURE FOR MULTIPLE PARTY CODE DEVELOPMENT

(75) Inventors: Prohor Chowdhury, Bangalore (IN);
Alexander Tessarolo, Lindfield (AU);
David Peter Foley, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/527,701

(22) Filed: Jun. 20, 2012

(65) Prior Publication Data

US 2012/0331560 A1    Dec. 27, 2012

Related U.S. Application Data

(60) Provisional application No. 61/500,458, filed on Jun. 23, 2011.

(51) Int. Cl.
*G06F 7/04* (2006.01)

(52) U.S. Cl.
USPC .......................................................... 726/26

(58) Field of Classification Search
USPC .......................................................... 726/26
See application file for complete search history.

(56) References Cited

U.S. PATENT DOCUMENTS

| 7,444,476 B2 | 10/2008 | Gnanasabapathy et al. |
| 2011/0191562 A1* | 8/2011 | Chou et al. .................... 711/163 |

* cited by examiner

*Primary Examiner* — Jacob Lipman
(74) *Attorney, Agent, or Firm* — John R. Pessetto; Wade J. Brady, III; Frederick J. Telecky, Jr.

(57) ABSTRACT

Multiple secure environments are established within a system on a chip (SoC) by defining a first secure region within a non-volatile memory in the SoC with a first set of parameters written into a predefined parameter region of the non-volatile memory. A second secure region within the non-volatile memory may be defined at a later time by a second set of parameters written into another predefined parameter region of the non-volatile memory. A security module is initialized each time the SoC is powered on by transferring the first set of parameters and the second set of parameters from the parameter region to the security module in a manner that does not expose the first set of parameters or the second set of parameters to a program being executed by the processor. The multiple secure regions of the SoC are enforced by the security module according to the parameter data.

6 Claims, 3 Drawing Sheets

MICROCONTROLLER WITH SECURE FEATURE FOR MULTIPLE PARTY CODE DEVELOPMENT

CLAIM OF PRIORITY UNDER 35 U.S.C. 119(e)

The present application claims priority to and incorporates by reference U.S. Provisional Application No. 61/500,458, filed Jun. 23, 2011, entitled "A Code Security Architecture to Aid Multiple Party Development of Embedded Software."

FIELD OF THE INVENTION

This invention generally relates to providing multiple secure environments on a microcontroller, and in particular, to the use of embedded non-volatile memory to provide multiple secure environments.

BACKGROUND OF THE INVENTION

In many systems, a secure environment may be provided by a memory management unit (MMU) that includes permission controls for various blocks of system memory and other resources. In general, the use of security protection in deeply embedded systems has existed for a while but traditionally has been limited to a supervisor vs. user modal and/or an MPU (memory protection unit).

Neither mechanism provides protection of code developed by one party from piracy when a second party is also developing code for the system.

BRIEF DESCRIPTION OF THE DRAWINGS

Particular embodiments in accordance with the invention will now be described, by way of example only, and with reference to the accompanying drawings.

Figure 1:
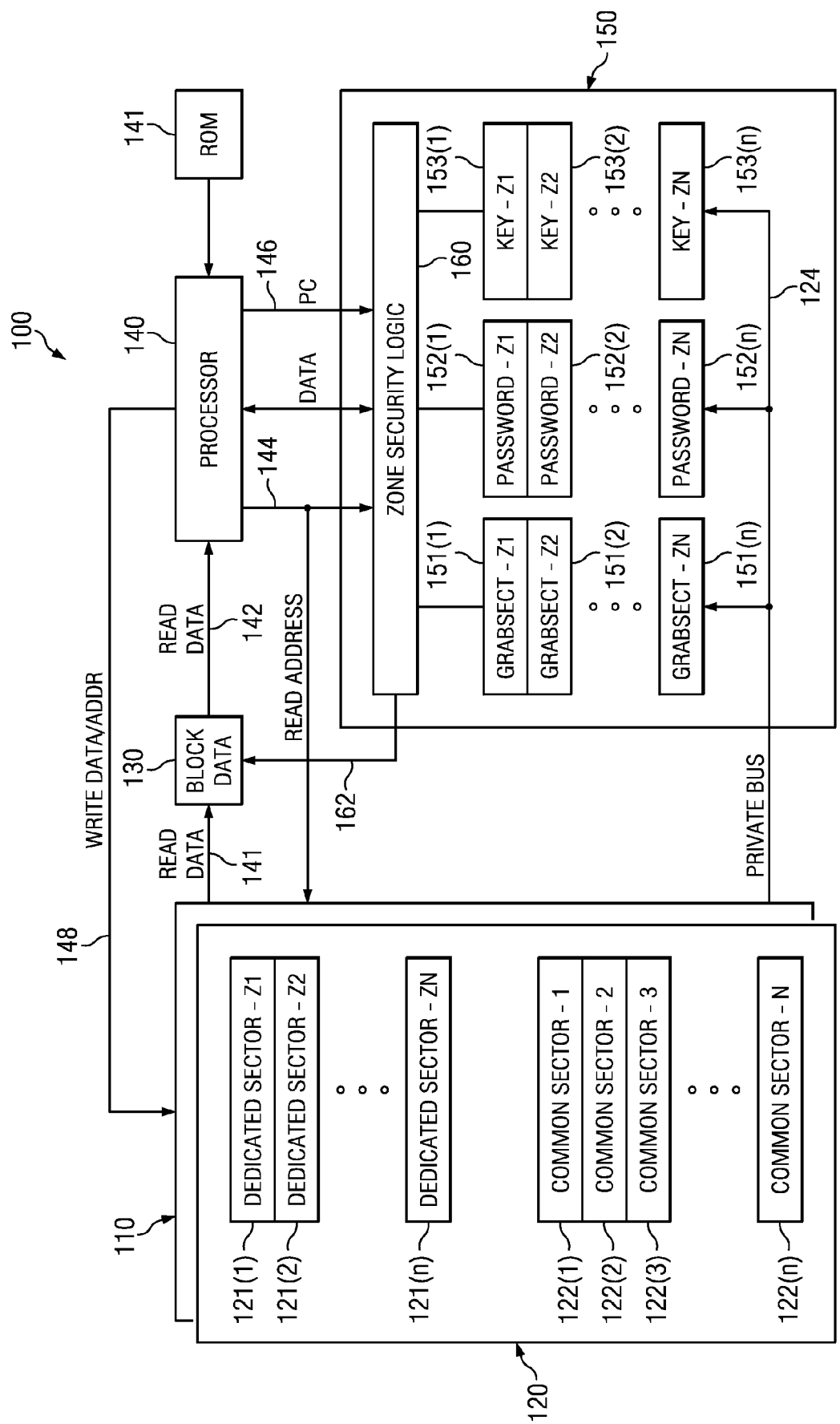
FIG. 1 illustrates a system on a chip (SoC) that provides a security feature for multiple party code development.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a multi-security zone solution for chips that cater to embedded software development by multiple parties. Code security for embedded applications is a means of preventing un-authorized copying of the software IP (intellectual property) which resides on a system on chip (SOC) device. These software IP typically reside on the device's on-chip non-volatile memories, such as ROM (read only memory), Flash, FRAM (ferroelectric random access memory), etc. Code security is a mechanism for preventing visibility to the content stored in an embedded non-volatile memory by one developer by another developer or by an un-authorized user of this chip.

While the architecture described herein may be applied to any non-volatile memory, the embodiment described herein makes use of flash memory that is now widely used in SoC because of it's non-volatile characteristic, ease of programming, and reasonable price. The code security mechanism allows collaborative development of embedded software for a single chip by multiple parties and provides protection for software IP of each party against all other parties who may have access to the SoC, either during development of code or after a finished system is deployed in the market place.

Although the invention described below may be applied to any non-volatile memory, flash memory is used for explanation in this document. In this embodiment, the flash memory is embedded within an SoC and the memory read bus is not available on the pins of the package, therefore the contents of the flash memory is not visible outside of the chip. Therefore, it would require significant effort to discover the contents of data within a secure zone by probing the chip or by other means of observing operation of the internal buses of the chip.

There exist many chips on the market today which provided code security to their embedded flash using various methods. But in today's embedded software development scenario, where increasingly software is developed by multiple parties (such as the primary developer, core IP providers, sub-contractors, etc.), there is a demand to extend code security protection between these multiple parties. The following cases illustrate valid scenarios of embedded software development today.

CASE-1: The primary developer develops a code module or application module IP and then stores it in the flash memory of an SoC. The primary developer then out-sources peripheral functions to a subcontractor. The primary developer does not want his source code visible to the subcontractor, but the subcontractor must be able to run the primary developer code during debug and vice versa. The primary developer should have access to the subcontractor code, however, others should not.

CASE-2: A third party develops an application specific code module and wants to sell usage of the code module to the primary developer. The third party doesn't want his source code visible; however, the primary developer must be able to run the third party code during debug. The primary developer code must be protected from the third party and others.

CASE-3: The primary developer who develops a primary code module for the SoC, and then sells the SoC along with the primary code module installed in the SoC to a customer. The customer then develops and adds a customer code module to the SoC. The primary developer doesn't want his source code visible to his customer or anyone else, but the primary code module must be usable by the customer. The customer must be able to run their code during debug. Similarly the customer wants the customer's code to be protected from the primary developer and others.

The chips that cater to the above types of software development scenarios typically need to have a larger amount of embedded flash memory than a pure "single party" chip. A mechanism is provided to allow the large flash memory array to be split into several smaller arrays, known as "flash sectors". These flash sectors may then be divided between the multiple parties for their separate code development.

The code security architecture described herein provides multiple "security zones". Each security zone basically is a collection of one or more flash sectors that are used by a single party to develop its portion of the overall software. When enabled, each security zone has the following two fundamental properties: (1) code running in one security zone is able to call and execute a functions defined in another security zone; and (2) a function running in one security zone is prohibited from directly reading the contents of another security zone.

The code security architecture is flexible enough to partition the various flash sectors that exist on the chip to the different security zones into different combinations. A fixed partitioning is less desirable since the exact sizes of code residing on the various security zones can't be predicted ahead of time. Fixed partitioning of flash sectors may result in wastage, or even a shortage, of flash memory.

FIG. 1 illustrates various secure regions within a secure environment of a system on a chip (SoC) 100. Flash Controller 110 is a digital wrapper around the physical flash sectors of flash memory 120 that controls all of the accesses between processor 140 and flash memory 120. There is one dedicated flash sector 121(1)-121(n) for each security zone. Thus, dedicated sector 121(1) is dedicated to secure zone 1, dedicated sector 121(2) is dedicated to secure zone 2, etc. In addition, there is a set of common sectors 122(1)-122(n) that may be selected by a software developer to include within one of the secure zones. For example, common sectors 122(1, 3) may be assigned to security zone Z1, while sectors 122(2, n) may be assigned to security zone Z2. Common sectors 122 that have not been assigned to any security zone may be accessible by all users.

In some embodiments, common sectors 122 are all the same size. In other embodiments, sectors 122 may be of two or more different sizes and may be mixed and matched to optimize storage allocation.

A portion of each dedicated sector-Zn 121 includes a predefined location for a password and request bit(s) to define the corresponding security zone. The password may contain n bits. The higher the value of n, the better is the code security which can be achieved. The predefined location for these zone parameters is typically at the high end or the low end of the address range of the dedicated sector.

For each secure zone, at least one request bit per sector is provided to indicate the following two conditions:
CONDITION 1: The corresponding common flash sector is not requested for use for this particular secure zone;
CONDITION 2: The corresponding common flash sector is requested for use for this particular secure zone.
More than one bit may be provided to indicate the above two conditions to strengthen the code security.

The parameter bits stored in the predefined parameter location of each dedicated zone sector 121 which represent the above information are referred to as the "zone-define bits" in this disclosure. When a read operation is performed by processor 140 to the predefined zone parameter address range of a dedicated zone sector by the main processor, flash controller 110 transfers the parameter content to code security module 150 through a private bus 124. The zone-define bits and password information cannot be transferred through the regular read data bus 141/142 of the processor because these parameters must be invisible to any user code being executed by processor 140. The other read data from the sectors is provided via read bus 141/142 to the processor.

The code security module (CSM) 150 acts as an access filter module to block read data appearing on read-data bus 141 from reaching processor 140 when a security violation is detected. In this code security embodiment, data from instruction fetches are not blocked, only data reads and writes are blocked. When a read transaction to the zone parameter bits of a dedicated flash sector is performed, flash controller 110 transfers the accessed content to CSM 150 through private bus 124. Within the CSM module, for each of the security zones, there exists three types of registers, defined in Table 1.

TABLE 1

| CSM registers | |
|---|---|
| PASSWORD-Zx | For each of the security zones, a respective password is stored in these registers |
| GRABSECT-Zx | For each of the security zones, the respective "flash sector define bits" gets stored in these registers |
| KEY-Zx | For each of the security zones, there exists a writeable (and readable) KEY registers to hold a request key that is compared to the password register. |

For each of the security zones, the respective zone define bits are stored in a GRABSECT-Zx register 151(n) when they are fetched from the predefined zone parameter region of a corresponding dedicated zone sector and transferred across dedicated bus 124 to these registers.

For each of the security zones, a respective password is stored in a PASSWORD-Zx register 152(n) when it is fetched from the predefined zone parameter region of a corresponding dedicated zone sector and transferred across dedicated bus 124 to these registers.

For each of the security zones, there is a respective KEY-Zx writeable and readable KEY register 153(n). Once the zone-define bits are loaded and security partitioning has been done, zone security logic 160 within CSM module 150 continuously compares the PASSWORD and the KEY registers for each zone. If the comparison fails, the respective zone is said to be in the LOCKED state. In this state, software code being executed by processor 140 from outside this security zone would not have permission to read or write the content of this particular zone. Therefore an attempt to read data would be blocked by data-block logic 130 in response to control signal 162 from CSM 150. Similarly, an attempt to write data would be blocked by a write data-block logic (not shown) in response to control signal 162 from CSM 150. However, as mentioned before, a code module within the protection zone may be called or branched to and then executed; only data accesses are blocked.

If the comparison passes, the respective zone is said to be in the UNLOCKED state. In this state, there is no code security on the flash sectors belonging to this security zone. This state may be used during initial code development for ease of use, for example.

Since the zone parameter bits for a given security zone are stored within the dedicated sector-Zn of a security zone, as long as that security zone is enabled (locked), code that is not located within the security zone cannot modify the zone parameter bits for that security zone. However, code that is executed from within the security zone may modify the zone parameters of that security zone. Any such modification of zone parameters will take effect the next time the SoC is power cycled.

The partitioning of the flash sectors into dedicated security zones is performed by assigning each user one set of CSM register 151, 152, 153. Typically, one user, such as a primary developer, may determine how much flash storage is needed for its primary code module. The primary developer will then select a number of sectors that is sufficient to hold the primary code module and inform other users which sectors are available for their use. The primary developer will then write a password and zone define bits into the predefined zone parameter region of dedicated sector-Z1 121(1) for the sectors it has decided to use.

When flash memory 120 is initially fabricated, all bits are in an un-programmed state, usually equivalent to a logic "1". In this embodiment, dedicated sectors 121 and common sectors 122 may be loaded with program code using a flash write operation. At a later point in time, they may be re-written with a different code module. However, once a security zone is defined by a software developer and enabled, no other developer can access the software in that security zone. Likewise, no other developer can access the security zone parameters stored in the predefined zone parameter location of the dedicated zone sector.

Each time SoC 100 is powered up, a boot operation is performed by executing a boot code module by processor 140. This boot code module may be located in read only memory (ROM) 141, for example. Instructions within the boot code read all of the predefined zone parameter addresses in the dedicated zone sectors. As described above, reading an address in the predefined zone parameter region of each dedicated zone sector 121 causes the data to be transferred to CSM 150 and loaded into the corresponding registers 151, 152, 153 in order to initialize the CSM. Read address bus 144 is coupled to CSM 150 so that control logic 160 knows which address flash 120 is being accessed and can therefore cause the data supplied via private bus 124 to be loaded into the correct register 151(n)-153(n).

In order to prevent a malicious attack by halting the boot code and then trying to access protected data, all of the flash sectors are treated as inaccessible (reads are unconditionally blocked) until all of the GRABSECT-Zx registers 151(n) are loaded. This is because at this point, the ownership of the sectors by the various security zones is not known by the CSM. Allowing accesses prior to initializing the CSM could provide a security hole.

Once all the GRABSECT-Zx registers are loaded, the CSM control logic 160 partitions the flash sectors based on the information now stored in the GRABSECT_Zx registers 151 (n). In a multi-party software development scenario, a flash sector should be requested by only one user, and hence from only one security zone. If CSM 150 finds this condition, it allocates the sector to the requested security zone.

If a sector is requested from more than one security zone, CSM control logic 160 will make that particular flash sector inaccessible altogether. This could occur if one party is attempting to hack into another party's secure zone.

After CSM 150 is initialized by the boot code and control logic 160 has established the secure zone partitions based on sector define bits stored in the GRABSECT_Zx registers 151, processor 140 commences processing of instructions that are fetched from the various sectors in flash memory 120 according to the code modules stored therein.

The program counter (PC) bus 146 from the processor is coupled to CSM control logic 160. For every read to a flash sector 121, 122 from processor 140, CSM control logic 160 looks at the PC address on PC bus 146 to find out the location of the instruction which has requested a read transaction to flash 120. Based on the pipeline architecture of the processor, the PC exported from the processor needs to be aligned by the CSM module to the phase at which the processor exports the address of the read. The data read from the flash sector is blocked or not-blocked by data block logic 130 in response to control signal 162 from the CSM module based on the rules summarized in Table 2.

TABLE 2

Security zone operation

| Operating Mode | Fetch Location | Read-Data BLOCKED? |
|---|---|---|
| PASSWORD-Zx = KEY-Zx | Don't Care | NO |
| PASSWORD-Zx != KEY-Zx | Inside the security zone | NO |
| PASSWORD-Zx != KEY-Zx | Outside the security zone | YES |

Figure 2:
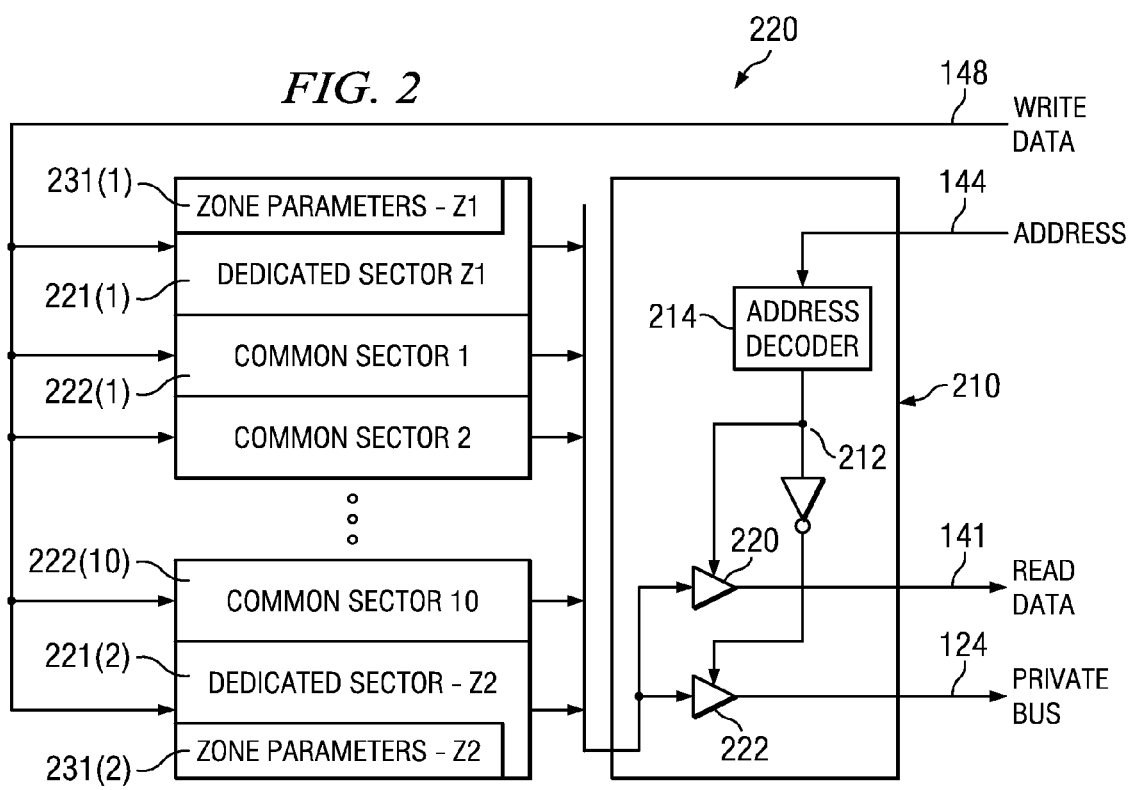
FIG. 2 is a more detailed block diagram of a flash memory with a private bus to support the security feature.

FIG. 2 is a more detailed block diagram of flash memory 220 illustrating operation of private bus 124. Flash memory 220 is similar to flash memory 120 except in this example there are only two dedicated zone sectors 221(1), 221(2). Within wrapper 210, there is an address decoder 214 that decodes addresses received on address bus 144 for each access request. When a received address matches one of the predefined addresses for a zone parameter in one of the dedicated zone sectors 221, the data read from the sector is enabled onto private bus 124 by buffer 222 and blocked from read bus 141 by buffer 220 in response to control line 212. When the address does not match one of the predefined addresses for a zone parameter in one of the dedicated zone sectors 221, then buffer 220 is enabled and data is provided read data bus 141 and thereby to processor 140 according to the rules of Table 2.

In order to better explain the operation of GRABSECT_Zx registers 151, FIG. 2 illustrates an embodiment with two zones (Z1 and Z2), and 10 flash sectors (sect1 to sect10). As described above, there a set of special addresses in flash 220 associated with each security zone that are used to define the two security zones. These special addresses will typically reside in the beginning of the first sector or at the end of the last sector as illustrated by zone parameters region-Z1 231(1) in dedicated sector-Z1 221(1) and zone parameters region-Z1 231(1) in dedicated sector-Z1 221(1). This arrangement allows contiguous space for user code development. Table 3 illustrates an example of the zone parameters for two security zones. The layout may be different from that of Table 3 in other embodiments, but the CSM control logic must be aware of the layout so that the CSM can be initialed correctly in response to the execution of boot code.

TABLE 3 parameter sector in flash memory

| Address | Purpose |
|---|---|
| PSWD_Z1 | Z1's password, 128 bits |
| GRAB_Z1 | placeholder for the request bits for each of the 10 sectors for Z1 |
| PSWD_Z2 | Z2's password, 128 bits |
| GRAB_Z2 | placeholder for the request bits for each of the 10 sectors for Z2 |

In this embodiment, PSWD_Z1 and PSWD_Z2 allow for 128 bit passwords. In other embodiments, the password length may be different.

In this embodiment, in order to make the request definition stronger, each sector has a two-bit request field, as defined by Table 4. This means GRAB_Z1 and GRAB_Z2 will each have twenty bits: ten sectors with two request bits.

TABLE 4 sector request bits

| | |
|---|---|
| 11 | This is the erased state of flash, means no-request |
| 01 or 10 | This differential value means a request |
| 00 | This is an illegal value. This makes the associated flash sector inaccessible |

As describe earlier, when SoC 100 powers up, boot ROM code performs a read to the above special zone parameter address locations. This transfers their content to CSM 150 via private bus 124. After the contents are transferred, the CSM consolidates the request bits from Z1 and Z2 and does the partitioning of the available sectors based on the rules in Table 5.

TABLE 5

Partitioning rules

| Z1 bits | Z2 bits | State of sect-n | Remarks |
|---|---|---|---|
| 11 | 11 | Sect-n is considered a free resource, available to any user | In a fresh part, flash is erased (all 1s) and hence the content of the request bits will be 11 for both the zones. Users can develop code without any security if the request bits are left un-programmed |
| 10 or 01 | 11 | Sect-n belongs to Z1 | This means only Z1 user has requested this sector. CSM module will grant the sector to Z1. |
| 11 | 01 or 10 | Sect-n belongs to Z2 | Similar as above |
| 01 or 10 | 01 or 10 | Sect-n is made inaccessible | This is to prevent the developer of the $2^{nd}$ zone to allow him to request the same sector as used by the $1^{st}$ zone. |
| 00 | XX | Sect-n is made inaccessible | A '00' is an illegal request and hence the sector is made in-accessible |
| XX | 00 | Sect-n is made inaccessible | Similar as above |

As mentioned earlier, before the request bits are transferred to the CSM module by the boot ROM code, the sectors are made inaccessible. This is because before the CSM is initialized with the request bits, it's not certain what sector belongs to what zone. Without this restriction, a hacker could attack by means such as connecting a debugger, halting the code before boot ROM code executes, and accessing the sector contents.

In a two phase development, first user of Z1 may request his needed sector(s) by programming associated request bits in the GRAB_Z1 address location 231(1) in dedicated sector 221(1). After the device boots up, his application can freely run within the sectors belonging to Z1. Later, a Z2 user may also request his needed sector(s) by programming the associated request bits in the GRAB_Z2 address location 231(2) in dedicated sector 221(2) and develop his code within the sectors belonging to Z2.

Figure 3:
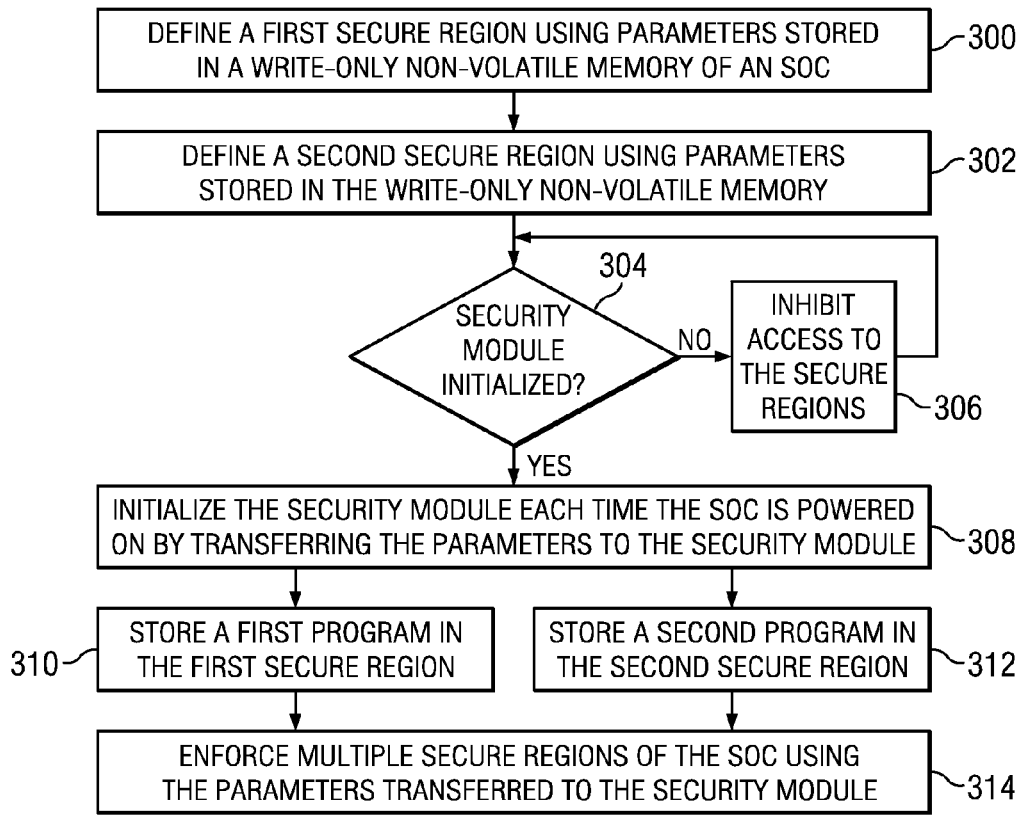
FIG. 3 is a flow diagram illustrating operation of multiple secure zones for multiple party code development.

FIG. 3 is a flow diagram illustrating operation of multiple secure zones for multiple party code development in a system such as SoC 100. A first secure region is defined 300 within a non-volatile memory in the SoC by receiving a first set of zone parameters written into a predetermined first zone parameter region of the non-volatile memory. As described above, once the first secure region is enabled, another user in another region cannot change the set of zone parameters in the first region. As described above, the first secure region may be defined by a first developer.

A second secure region may be defined 302 within the non-volatile memory of the SoC at a later time by receiving a second set of zone parameters written into a predetermined second parameter region the non-volatile memory. Again, once the second secure region is enabled, another user in another region cannot change the set of zone parameters in the second region. This may be done by a second developer at a later date.

A security module is initialized 308 each time the SoC is powered on by transferring the first set of parameters and the second set of parameters from the parameter region to the security module in a manner that does not expose the first set of parameters or the second set of parameters to a program being executed by the processor.

The multiple secure regions of the SoC are then enforced 314 by the security module. This security enforcement allows a first program in the first secure region to call a second program in the second secure region and prohibits the first program from reading data from the second secure region. This security enforcement also allows the second program in the second secure region to call the first program in the first secure region and prohibits the second program from reading data from the first secure region.

All access to a region of the nonvolatile memory is inhibited when that region is defined in both the first secure region and the second secure region. Likewise, when the security module is not completely initialized 304 after power-on of the SoC, access to all secure regions is inhibited 306. This prevents access to the secure regions by covert or malicious attempts to access code and data stored therein.

A first program may be stored 310 in the first secure region by an initialization process. For example, code may be loaded during code development by the first developer. After the code is developed, production code may be loaded into the flash memory during or after production of the SoC. The code may be loaded into the flash memory by a processor that is coupled to the non-volatile memory, for example, or it may be loaded by an external system that is coupled to the SoC during production and testing of the SoC, for example.

In a similar manner, a second program is stored 312 in the second secure region by a different initialization process. For example, this may be done by a second developer that purchases the SoCs from the first developer and then adds code developed by the second developer.

Figure 4:
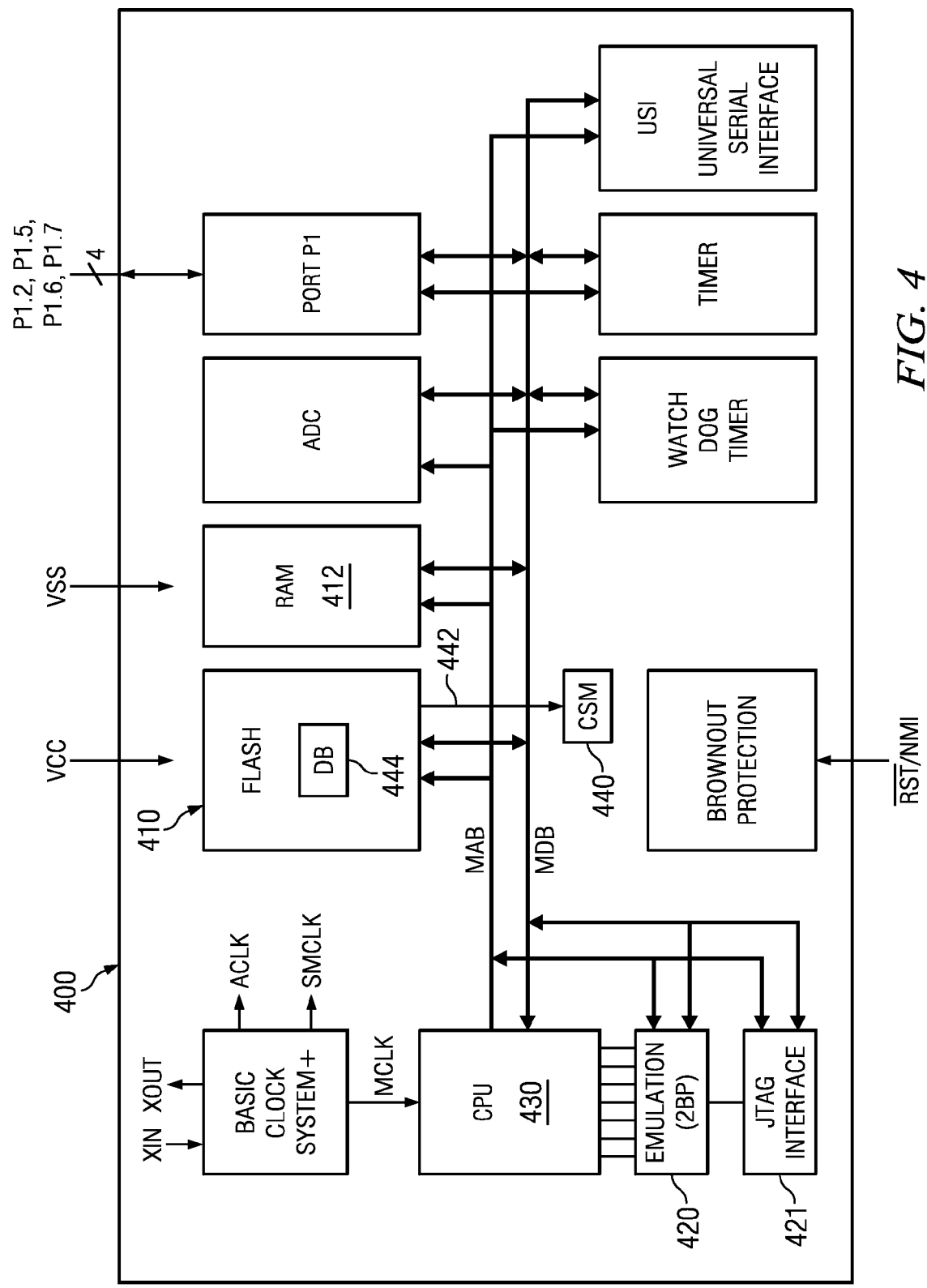
FIG. 4 is a block diagram of an SoC that provides multiple secure zones.

FIG. 4 is a block diagram of SoC 400 that is another embodiment of an SoC that provides a secure environment. Processor 430 is coupled to flash memory 410 and random access memory 412 via address bus MAB and data bus MDB. Various peripherals may also be coupled to the address and data bus. As described in more detail above, multiple secure zones may be established in flash memory 410 by zone-define bits that are written to special regions of flash memory 410. Each time a special region is read, the contents are transferred to code security module 440 via private bus 442. Code security module 440 operates in a similar manner as described in more detail above for CSM 150. Thereafter, each time SoC 400 is reset, CSM 440 is configured by transferring the stored security parameters from the special regions of flash 410 to CSM 440 in response to read transactions from boot code with no data visibility to software or external exposure. CSM 440 then enforces each secure zone by allowing execution of program code stored within a defined secure zone, but preventing data access into a secure zone from instructions that are outside of the secure zone. Anytime a security violation is detected by CSM 440, it asserts a control signal to data blocking module 444 to prevent data from being read from or written into flash 410.

As discussed previously, access to the secure zones is inhibited if CSM is not properly initialized. This prevent malicious access to a secure zone by debug and emulation ports 420, 421, for example.

OTHER EMBODIMENTS

While the invention has been described with reference to illustrative embodiments, this description is not intended to be construed in a limiting sense. Various other embodiments of the invention will be apparent to persons skilled in the art upon reference to this description. For example, while a flash memory was described herein, other types on non-volatile memory may be protected using the techniques described herein.

In another embodiment, multiple secure regions in a random access memory (RAM) may be enforced by preventing reading or writing of data within a secure zone by code that is not within the secure zone.

In another embodiment, the CSM may include a portion of non-volatile memory that may be programmed with the zone-define bits and zone passwords and operate in the same manner as the GRABSECT-Zn and PASSWORD-Zn registers 151, 152 described herein. In such an embodiment, the special zone parameter regions in the flash memory would not be needed.

In another embodiment, the placement of the predefined zone parameter regions may be located elsewhere than suggested herein, as long as the CSM is aware of the locations.

In another embodiment, the zone parameters regions may be implemented as bits that are "blown", such as fusible links, read only memory bits, flash bits without provision for erasure, etc.

While a single chip system SoC was described herein, other devices and components may be coupled to a chip containing one or more processors, non-volatile memory and security hardware to produce a multiple chip system with a secure execution environment enforced within the SoC as described herein.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for establishing multiple secure environments within a system on a chip (SoC), the method comprising:
    defining a first secure region within a non-volatile memory in the SoC by receiving a first set of parameters written into a parameter region of the first secure region;
    defining a second secure region within the non-volatile memory of the SoC by receiving a second set of parameters written into a parameter region of the second secure region;
    initializing a security module each time the SoC is powered on by transferring the first set of parameters and the second set of parameters from the parameter regions to the security module in a manner that does not expose the first set of parameters or the second set of parameters to a program being executed by the processor; and
    enforcing the multiple secure regions of the SoC by the security module according to the first and second sets of parameters, wherein the first set of parameters is protected from change while enforcement of the first secure region is enabled and the second set of parameters is protected from change while enforcement of the second secure region is enabled.

2. The method of claim 1, wherein the enforcing multiple secure environments comprises:
    allowing a first program in the first secure region to call a second program in the second secure region and prohibiting the first program from reading data from the second secure region; and
    allowing the second program in the second secure region to call the first program in the first secure region and prohibiting the second program from reading data from the first secure region.

3. The method of claim 1, further comprising:
    storing a first program in the first secure region by an initialization process; and
    storing a second program in the second secure region by a different initialization process.

4. The method of claim 1, further comprising inhibiting all access to a region of the nonvolatile memory that is defined in both the first secure region and the second secure region.

5. The method of claim 1, wherein the first set of parameters includes a password, further comprising disabling enforcement of the first secure environment after the processor writes a data value into the security module matching the password.

6. The method of claim 1, further comprising inhibiting access to the first secure region and to the second secure region until after the security module is initialized each time the SoC is powered on.

\* \* \* \* \*